United States Patent
Yamaguchi et al.

[11] Patent Number: 6,166,144
[45] Date of Patent: Dec. 26, 2000

[54] POLYPROPYLENE RESIN COMPOSITION

[75] Inventors: Masayuki Yamaguchi; Kenichi Suzuki; Hiroshi Miyata, all of Mie, Japan

[73] Assignee: Tosoh Corporation, Yamaguchi, Japan

[21] Appl. No.: 09/131,676

[22] Filed: Aug. 10, 1998

[30] Foreign Application Priority Data

Aug. 8, 1997 [JP] Japan ................................ 9-215050

[51] Int. Cl.⁷ ................................................ C08L 45/00
[52] U.S. Cl. ........................................ 525/211; 525/232
[58] Field of Search ................................ 525/191, 211, 525/232

[56] References Cited

U.S. PATENT DOCUMENTS

| | | | |
|---|---|---|---|
| 4,259,410 | 3/1981 | Dittmann | 428/161 |
| 5,047,446 | 9/1991 | DeNicola | 522/157 |
| 5,047,485 | 9/1991 | DeNicola | 525/387 |
| 5,407,991 | 4/1995 | Hikasa | 524/491 |
| 5,591,785 | 1/1997 | Scheve | 522/157 |
| 5,731,362 | 3/1998 | Scheve | 521/142 |
| 5,786,403 | 7/1998 | Okada | 521/134 |

FOREIGN PATENT DOCUMENTS

| | | | |
|---|---|---|---|
| 0 170 255 | 2/1986 | European Pat. Off. | C08F 297/08 |
| 0 184 324 | 6/1986 | European Pat. Off. | C08L 23/16 |
| 0 593 221 | 4/1994 | European Pat. Off. | C08L 23/10 |
| 0 603 723 | 6/1994 | European Pat. Off. | C08L 23/10 |
| 0 730 003 | 9/1996 | European Pat. Off. | C08L 23/10 |
| 1 694 622 | 8/1971 | Germany | C08F 29/02 |

*Primary Examiner*—Paul R. Michl
*Attorney, Agent, or Firm*—Sughrue, Mion, Zinn, Macpeak & Seas, PLLC

[57] ABSTRACT

A polypropylene resin composition having the following conditions (a) and (b):

(a) the resin composition can be drawn such that a diameter d of a strand obtained when the resin composition is extruded from a circular die having an inside diameter D is
$d \leq 0.25 \times D$, and (b) the ratio of the maximum value of elongational viscosity to the maximum value of shear viscosity, measured at the same temperature and the same rate of strain is:
elongetional viscosity/shear viscosity $\geq 5$.

The polypropylene resin composition is suitable for processing such as blow molding, vacuum forming, film extrusion, extrusion coating, spinning, foam processing, etc.

4 Claims, No Drawings

POLYPROPYLENE RESIN COMPOSITION

FIELD OF THE INVENTION

The present invention relates to a polypropylene resin composition having excellent processability.

BACKGROUND OF THE INVENTION

Hitherto, a polypropylene resin has been well known as a general-purpose polymeric material having excellent heat resistance. However, it is known that when the resin is used for blow molding, vacuum forming, pressure forming, film extrusion, extrusion coating, spinning, and foam processing, the problems occur of non-uniformity in the wall thickness, neck-in, surging, resonance, non-uniformity in the cellular structure, etc. Many of these inferior molding problems are related with elongational viscosity and it is generally known that when the elongational viscosity is sufficiently larger than shear viscosity at the same temperature and the same rate of strain, the moldability is improved (M. Shinohara, *Journal of the Society of Rheology, Japan*, Vol. 19, 118 (1991)). However, in general the elongational viscosity of a polypropylene resin is only about three times the shear viscosity at the same rate of strain.

Accordingly, to increase the elongational viscosity of a polypropylene resin, a method of broadening the molecular weight distribution of a polypropylene resin or adding a branched type low density polyethylene (LDPE) has been conducted.

Furthermore, in recent years polypropylene having long chain branches has been developed and is on the market (*Plastic Engineering*, page 82, March 1991).

However, the limit of the ratio of elongational viscosity/shear viscosity of a polypropylene resin at the same temperature and the same rate of strain is about 4, and the improved effect on the processability is insufficient. On the other hand, the polypropylene having long chain branches has poor melt drawing property, so that poor molding frequently occurs.

SUMMARY OF THE INVENTION

The present invention has been made to overcome the above-described problems.

Accordingly, an object of the present invention is to provide a polypropylene resin composition suitable for blow molding, vacuum forming, pressure forming, film extrusion, extrusion coating, spinning, foam processing, etc.

As a result of various investigations to overcome the above-described problems, it has been found that a polypropylene resin composition having specific characteristics has excellent working characteristics. The present invention has been completed based on this finding.

The present invention relates to a polypropylene resin composition satisfying the following conditions (a) and (b):

(a) the resin composition can be drawn such that a diameter d of a strand obtained when the resin composition is extruded from a circular die having an inside diameter D is
$d \leq 0.25 \times D$, and (b) a ratio of the maximum value of elongational viscosity to the maximum value of shear viscosity, measured at the same temperature and the same rate of strain is: elongational viscosity/shear viscosity $\geq 5$.

DETAILED DESCRIPTION OF THE INVENTION

The present invention is described in detail below.

The polypropylene resin composition of the present invention can be drawn such that the diameter d of a strand obtained when the resin composition is extruded from a circular die having an inside diameter D, for the evaluation of the melt drawing property is $d \leq 0.25 \times D$, and preferably $d \leq 0.20 \times D$. In the event that a polypropylene resin composition cannot be drawn so as to satisfy the relationship of $d \leq 0.25 \times D$, such a resin composition has a poor melt drawing property, so that the resin composition is poor in processability because it is impossible to carry out high drawing. Consequently, the appearance of the products is not good.

Conventional methods can be used as the measurement method of the melt drawing property. For example, a method of using an actual spinning machine, a method of a capillary type rheometer, etc., can be used. The measurement temperature condition is preferably that the measurement is conducted at a temperature of 170 to 250° C., which is a general temperature range as a measurement condition of polypropylene resins.

There is no particular limitation on the inside diameter D and the length L of the die used for the measurement, and thus easy measurement becomes possible. The measurement is preferably conducted using a die having the inside diameter D of 0.1 to 5 mm and the length L of 0.1 to 100 mm, at an extrusion rate of the strand of 0.02 to 2 m/min and at a residence time of 3 to 30 minutes. In the present invention, the diameter d of the strand is measured when the measurement is conducted at the drawable maximum take-off speed under the conditions of 190° C., the cylinder descending speed of 10 mm/min, and a residence time of 6 minutes and was determined by a capillary type rheometer, using a die having L/D of 2.95/1 (mm).

The polypropylene resin composition of the present invention is one where the ratio of the maximum values of the elongational viscosity and the shear viscosity, measured at the same temperature and the same rate of strain is, elongational viscosity/shear viscosity $\geq 5$, and preferably, elongational viscosity/shear viscosity $\geq 8$.

If the ratio is elongational viscosity/shear viscosity>5, a polypropylene resin composition obtained tends to cause poor processability, such as non-uniformity in the wall-thickness, neck-in, resonance, surging, and so on.

The measurement method is that the measurement temperature is preferably 170 to 250° C., which is the actual processing temperature, and the rate of strain is preferably 0.01 to 1 sec$^{-1}$. The measurement of the shear viscosity is preferably conducted using a cone-plate type rheometer, and the measurement method thereof is, for example, the method described in Ferry, *Viscoelastic Properties of Polymers*, Third edition, Wiley, New York (1980). Further, the measurement method of the elongational viscosity is, for example, the method described in O. Ishizuka, et al., Polymer, Vol. 21, 164(1980).

The measurement of the elongational viscosity in the present invention was conducted using a Meissner type log elongational viscometer, at a temperature of 190° C., and at a rate of strain of 0.1±0.05 sec$^{-1}$. Further, the shear viscosity was measured using a cone-plate type rheometer at a temperature of 190° C., and the shear viscosity at a rate of strain of 0.1 sec$^{-1}$ was determined.

From the viewpoint that the polypropylene resin of the present invention particularly results in a decrease in the occurrence of non-uniformity in the wall thickness and has excellent processability, the melt tension thereof is preferably at least 3 g. The measurement condition of the melt tension is the same as the measurement condition of the melt drawing property.

Further, from the viewpoint that the polypropylene resin composition of the present invention is a resin composition having excellent processability such as, in particular, in the melt drawing property, the flow apparent activation energy is preferably 35 to 45 kJ/mol. The measurement method of the flow apparent activation energy can be the method described in, for example, *Koza (Course) Rheology*, edited by Rheology Society, published by Koubunsi Kanko Kai, etc. That is, the flow apparent activation energy can be determined by measuring the dynamic viscoelasticity of the polypropylene resin composition of the present invention at at least 2 optional temperatures of from 170° C. to the decomposition temperature of the polypropylene resin composition.

If the polypropylene resin composition of the present invention has a melt flow rate of 0.01 to 100 g/10 min, measured at a temperature of 230° C. and a load of 2.16 kg, the resin composition has good working characteristics. Therefore, such a resin composition is preferable.

The polypropylene resin composition of the present invention may be any polypropylene resin compositions if the resin composition can be drawn such that (a) the diameter d of the strand thereof extruded from a circular die having an inside diameter D is $d \leq 0.25 \times D$ and (b) the ratio of the maximum value, of the elongational viscosity and the shear viscosity measured at the same temperature and the same rate of strain is elongational viscosity/shear viscosity$\geq 5$. Such a polypropylene resin composition includes a polypropylene resin composition comprising a crosslinked product of an ethylene/α-olefin/non-conjugated diene copolymer elastomer satisfying the following conditions (c) to (e) and a polypropylene resin:

(c) the α-olefin has a carbon number of from 4 to 20;

(d) the ratio of the units originated from ethylene and α-olefin is ethylene/α-olefin=35/65 to 5/95 (by weight ratio); and (e) the iodine value is larger than 0 and at most 50.

In particular, the resin composition wherein the ratio of the melt flow rate (MFR 1) of the crosslinked product and the melt flow rate (MFR 2) before crosslinking is MFR 2/MFR 1>10 or the measurement of MFR 1 is impossible is preferred in view of the fact that the problems such as neck-in, resonance, surging, etc., do not occur in molding and processing the polypropylene resin composition.

The polypropylene resin constituting the polypropylene resin composition of the present invention can be any polypropylene resins generally known as crystalline polypropylene resins, and examples thereof include propylene homopolymer, a propylene-ethylene random copolymer having an ethylene content of 0.5 to 12% by weight, a propylene/ethylene/α-olefin terpolymer having an ethylene content of 0.5 to 12% by weight and a content of α-olefin such as 1-butene of 0.5 to 20% by weight, a high-impact polypropylene having an ethylene content of 1 to 60% by weight, a polypropylene having introduced therein long chain branches, and a syndiotactic polypropylene. Those can be used alone or as a mixture of 2 or more kinds thereof. The polypropylene resin preferably has a melt flow rate at a temperature of 230° C. and at a load of 2.16 kg of 0.01 to 100 g/10 min.

The crosslinked product of the ethylene/α-olefin/non-conjugated diene copolymer elastomer shown as one example of the constituents of the polypropylene resin composition of the present invention satisfies the following conditions (c) to (e):

(c) the α-olefin has a carbon number of from 4 to 20;

(d) the ratio of the units originated from ethylene and α-olefin is ethylene/α-olefin=35/65 to 5/95 (by weight ratio); and (e) the iodine value is larger than 0 and at most 50.

The ethylene/α-olefin/non-conjugated diene copolymer elastomer used for crosslinking preferably comprises ethylene, an α-olefin, and a non-conjugated diene copolymer and satisfies conditions (c) to (e) described above.

Examples of the α-olefin having a carbon number of from 4 to 20 include 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadene, 1-hexadecene, 1-heptadecene, 1-octadene, 1-nonadecene, and 1-eicosene. Those can be used alone or as a mixture of two or more kinds. Of those α-olefins, 1-butene, 1-heptene, 1-hexene, and 1-octene are preferred from the ease of availability. Further, the ratio of the units originated from ethylene and an α-olefin is preferably 35/65 to 5/95, and more preferably 30/70 to 5/95, by weight ratio from which a polypropylene resin composition having excellent processability is obtained.

Examples of the non-conjugated diene used for the ethylene/α-olefin/non-conjugated diene copolymer elastomer before crosslinking include 1,4-pentadiene, 1,4-hexadiene, 4-methyl-1,4-hexadiene, 5-vinyl-2-norbornene, 5-ethylidene-2-norbornene, 5-isopropenyl-2-norbornene, 2,5-norbonadiene, dicyclopentadiene, 7-methyl-1,6-octadiene, 1,7-octadiene, and 1,9-dicadiene. Those can be used alone or as a mixture of two or more kinds of them.

The iodine value which is the copolymerization amount of the non-conjugated diene is preferably larger than 0 and at most 50 such that the polypropylene resin composition having excellent low temperature toughness is obtained. The iodine value can be measured by the method as described in *Gomu Shiken Hou (Rubber Test Method)*, page 657, edited by Nippon Gomu Kyoukai (1963).

The ethylene/α-olefin/non-conjugated diene copolymer elastomer before crosslinking has an excellent handling property at the crosslinking step, etc. Therefore, its Mooney viscosity ($ML_{1+4}$) at 100° C. is preferably 5 to 400, and more preferably 20 to 200.

The production method of such an ethylene/α-olefin/non-conjugated diene copolymer elastomer can be a conventional method, and there is no particular limitation on the method. For example, the elastomer can be obtained by polymerizing ethylene, an α-olefin, and a non-conjugated diene described above using a titanium catalyst, a vanadium catalyst, or metallocene catalyst. Of those catalysts, use of the metallocene catalyst can easily produce the elastomer.

There is no particular limitation on the method of obtaining the crosslinked product of the ethylene/α-olefin/non-conjugated diene copolymer elastomer by crosslinking the ethylene/α-olefin/non-conjugated diene copolymer elastomer. For example, a method of crosslinking the ethylene/α-olefin/non-conjugated diene copolymer elastomer with electron rays or a peroxide is used.

Where crosslinking is conducted with electron rays, the irradiation amount is preferably 10 kGray or higher so that the moldability of the polypropylene resin composition obtained is excellent.

Where heat-crosslinking is conducted using a peroxide, examples of the peroxide include ketone peroxides such as methyl ethyl ketone peroxide, cyclohexanone peroxide, 3,3,5-trimethylhexanone peroxide, methylcyclohexanone peroxide, methyl acetoicetate peroxide, acetylacetone peroxide, etc.; peroxyketals such as 1,1-bis(t-butylperoxy)-3,3,5-trimethylcyclohexane, 1,1-bis(t-butylperoxy)

cyclohexane, 2,2-bis(t-butylperoxy)octane, 2,2-bis(t-butylperoxy)butane, n-butyl-4,4-bis(t-butylperoxy)hexane, etc.; hydroperoxides such as t-butyl hydroperoxide, cumene hydroperoxide, di-isopropylbenzene hydroperoxide, p-methane hydroperoxide, 2,5-dimethylhexane-2,5-d-hydroperoxide, 1,1,3,3-tetramethylbutyl hydroperoxide, etc.; dialkylperoxides such as di-t-butyl peroxide, t-butylcumyl peroxide, dicumyl peroxide, $\alpha,\alpha'$-bis(butylperoxy-m-isopropyl)benzene, 2,5-dimethyl-2,5-di-(t-butylperoxy)hexyne-3, etc.; diacyl peroxides such as acetyl peroxide, isobutyl peroxide, octanoyl peroxide, decanoyl peroxide, lauroyl peroxide, 3,3,5-trimethylhexanoyl peroxide, succinic acid peroxide, benzoyl peroxide, 2,4-dichlorobenzoyl peroxide, etc.; peroxydicarbonates such as di-isopropyl peroxydicarbonate, di-2-ethylhexyl peroxydicarbonate, di-n-propyl peroxydicarbonate, bis(4-t-butylcyclohexyl) peroxydicarborate, di-2-ethoxyethyl peroxydicarbonate, di-methoxyisopropyl peroxydicarbonate, di-(3-methyl-3-methoxybutyl) peroxydicarbonate, diallyl peroxydicarbonate, etc.; and peroxy esters such as t-butyl peroxyacetate, t-butyl peroxyisobutyrate, t-butyl peroxylaurate, t-butyl peroxybenzoate, di-t-butyl peroxyisophthalate, 2,5-dimethyl-2,5-di-(benzoylperoxy)hexane, t-butyl peroxide isopropyl carbonate, etc. Those can be used alone or as a mixture of 2 or more kinds.

Where crosslinking is conducted using the peroxide, a crosslinking azcelerator or a co-crosslinking agent can be used together.

Examples of the crosslinking accelerator include guanidine derivatives such as N,N-diphenylguanidine, N,N-di-(o-tolyl)guanidine, N,N-o-tolylguanidine, etc.; thioureas such as N,N-dibutylthiourea, N,N'-diethylthiourea, dilaurylthiourea, 2-mercaptoimidazoline, trimethylthiourea, tetramethylthiourea, etc.; xanthates such as zinc dibutylxanthate, sodium isopropylxanthate, zinc isopropylxanthate, etc.; dithiocarbamates such as zinc dimethyldithiocarbamate, zinc diethyldithiocarbamate, zinc dibutyldithiocarbamate, zinc ethylphenyldithiocarbamate, zinc N-pentamethylenedithio-carbamate, zinc dibenzyldithiocarbamate, sodium dimethyldithiocarbamate, sodium diethyldithiocarbamate, sodium dibutyldithiocarbamate, copper dimethyldithiocarbamate, tellurium diet-hyldithiocarbamate, piperidinium pentamethylenedithiocarbamate, pipecoline piperidimethyldithicarbamate, iron dimethyldithiocarbamate, etc.; aldehyde ammonia-based compounds such as hexamethylenetetramine, acetaldehyde aniline, butylaldehyde aniline, etc.; thiazole-based compounds such as dibenzothiazyL disulfide, 2-(4-morpholinodithio)benzothiazole, 2-(2,4-dinitrophenyl) mercapto benzothiazole, etc.; thiuram sulfides such as tetramethylthiuram monosulfide, tetraethylthiuram monosulfide, tetrabutylthiuram disulfide, dipentanethylene (thiuram tetrasulfide, etc.; thiazole compounds such as mercaptobenzothiazole, dibenzothiazyl disulfide, zinc 2-mercaptobenzothiazole, etc.; and sulfenamide compounds such as N-cyclohexyl-2-benzothiazole sulfenamide, N-oxydiethylene-2-benzothiazole sufenamide, N-t-butylbenzothiazole sulfenamide, etc. These crosslinking accelerators can be used alone or as a mixture of two or more kinds of them.

Examples of the co-crosslinking agent include p-quinonedioxime, p,p'-dibenzoylquinonedioxime, N-methyl-N'-4-dinitroaniline, dinitrosobenzene, lauryl methacrylate, ethylene glycol dimethacrylate, triethylene glycol dimethacrylate, tetraethylene glycol dimethacrylate, polyethylene glycol dimethacrylate, trimethylolpropane trimethacrylate, diaryl fumarate, diaryl phthalate, tetraaryloxyethane, triaryl cyanurate, aryl methacrylate, maleimide, phenylmaleimide, N,N'-m-phenylenebis;maleimide, maleic anhydride, itaconic acid, divinylbenzene, diarylmelamine, diphenylguanidine, divinyl adipate, 1,2-polybutadiene, a liquid styrene-butadiene copolymer rubber, dipentamethylenethiuram pentasulfide, mercaptobenzthiazole, and sulfur. Those can be used alone or as a mixture of two or more kinds of them.

In crosslinking, a crosslinking accelerator aid such as zinc white, aztive zinc white, surface treated zinc white, zinc carbonate, litharge or magnesium oxide, a dispersant, etc., can further be used.

When the polypropylene resin composition of the present invention is constituted of the polypropylene resin and the crosslinked product of ethylene/$\alpha$-olefin/non-conjugated diene copolymer elastomer, there is no particular limitation on its blending ratio, and those can optionally be used in a proportion without deviating from the objects of the present invention. In particular, the ratio of the polypropylene resin to the crosslinked product of the ethylene/$\alpha$-olefin/non-conjugated diene copolymer elastomer is 99/1 to 70/30 (weight ratio) so as to obtain the polypropylene resin composition having excellent moldability and rigidity. The production method of the polypropylene resin composition is optional. The examples of the method are a method of blending the polypropylene resin and the crosslinked product of the ethylene/$\alpha$-olefin/non-conjugated diene copolymer elastomer with a kneader, roll mills, a Banbury mixer, a single screw extruder, a twin screw extruder, etc., and a method of blending the polypropylene resin and the ethylene/$\alpha$-olefin/non-conjugated diene copolymer elastomer before crosslinking and then conducting crosslinking while melt-kneading them.

If required and necessary, the polypropylene resin composition of the present invention can be compounded with an inorganic filler such as calcium carbonate, mica, talc, silica, barium sulfate, calcium sulfate, kaolin, clay, pyrophyllite, bentonite, serisanite, zeolite, nephelincinite, attapalgite, wollastonite, ferrite, calcium silicate, magnesium carbonate, dolomite, antimony trioxide, titanium oxide, iron oxide, molybdenum disulfide, graphite, gypsum, glass beads, glass powder, glass balloons, glass fibers, quartz, quartz glass, etc., or organic or inorganic pigments. Further, if required and necessary, a crystal nucleating agent, a transparency imparting agent, an antiblocking agent, a releasing agent, an antistatic agent, a slipping agent, an antifogging agent, a lubricant, a heat stabilizer, an ultraviolet stabilizer, a light stabilizer, a weathering stabilizer, a foaming agent, an antifungal agent, a rust-preventing agent, an ion trapping agent, a flame retardant, a flame retardant aid, etc., may be added.

The polypropylene resin composition of the present invention can also be blended with another resin and a rubber without deviating from the objects of the present invention. In this embodiment, if required and necessary, a compatibilizing agent may be added as still another component.

Examples of the another resin include linear high density polyethylene, linear low density polyethylene, branched low density polyethylene, an ethylene/vinyl acetate copolymer (EVA), an ethylene/ethyl acrylate copolymer, poly(1-butene), polyamide, poly(4-methyl-1-pentene), a styrene-based thermoplastic elastomer, and a polyolefin thermoplastic elastomer.

Examples of the rubber include a natural rubber, an acrylonitrile-butadiene rubber, a butadiene rubber, an isoprene rubber, a styrene-butadiene rubber, a silicone rubber, a polynorbornene rubber, a polyhexene rubber, an ethylene-propylene rubber, an ethylene-propylene-diene random copolymer rubber, and a chloroprene rubber.

Examples of the compatibilizing agent include adhesive polymers such as an acid-modified polyolefin, a saponified EVA, etc., and block or graft copolymers such as a polyolefin-polyamide graft or block copolymer.

The polypropylene resin composition of the present invention is processed by various processing methods such as an extrusion, a vacuum forming, spinning, foam processing, etc.

The present invention will be described in more detail by reference to the following examples, but it should be understood that the invention is not construed as being limited thereto.

Various measurements in the examples and the comparative examples are described below.

Measurement of content of ethylene and α-olefin in ethylene/α-olefin/non-conjugated diene copolymer elastomer:

The content was calculated by measuring the $^{13}$C-NMR spectrum (JNM GX400, trade name, manufactured by JEOL LTD.) at 100 MHz using o-dichlorobenzene as a solvent.

Measurement of Mooney Viscosity:

According to JIS K6300, Mooney viscosity of an ethylene/α-olefin/non-conjugated diene copolymer elastomer at 100° C. was measured using a Mooney viscometer (manufactured by Shimadzu Corporation). The rotor was an L type, the pre-heating time was 1 minute, and the working time of the rotor was 4 minutes.

Measurement of Elongational Viscosity:

Using a MELTEN Rheometer (manufactured by Toyo Seiki Seisakusho K.K.), the change of elongational viscosity with the passage of time was measured at a rate of strain of 0.1 sec$^{-1}$. The measurement temperature was 190° C.

Measurement of Shear Viscosity:

Using a cone-plate type rheometer (MR-500, trade name, manufactured by Rheology Co.), the change of shear viscosity with the passage of time was measured at a rate of strain of 0.1 sec$^{-1}$. The measurement temperature was 190° C.

Measurement of Flow Apparent Activation Energy:

Using a cone-plate type rheometer (MR-500, trade name, manufactured by Rheology Co.), dynamic viscoelasticity was measured at temperatures of 190° C. and 230° C. and the flow apparent activation energy was determined.

Measurement of Melt Drawing Property:

Melt drawing property was evaluated by a capillary rheometer (Capillograph, trade name, manufactured by Toyo Seiki Seisakusho K.K.). The drawable maximum take-off speed was measured under the conditions that the barrel temperature was 190° C., the inside diameter of the barrel was 9.55 mm, the L/D of a die was 2.95/1 (mm), and the descending rate of a cylinder was 10 mm/minute. The diameter of the drawn strand was measured and the value obtained by dividing the diameter by the diameter of the die was used as a standard of the melt drawing property.

Measurement of Melt Tension:

In the measurement of the melt drawing property, the melt tension when the take-off speed was 10 meters/minute was measured, Measurement of MFR:

According to JIS K6758, the MFR was measured under the conditions of a temperature of 230° C. and a load of 2.16 kg. Evaluation of blow moldability:

Using a Placo Co., Ltd.-made single layer blow molding machine, a container having a thickness of 1.5 mm and a capacity of 500 ml was molded. The cylinder temperature was C1: 180° C., C2: 190° C., C3: 200° C., and the head temperature was: 190° C.

Synthesis examples of the ethylene/α-olefin/non-conjugated diene copolymer elastomers used in the examples and the comparative examples are shown below.

SYNTHESIS EXAMPLE 1

In a 5 liter autoclave were placed 2,000 ml of toluene, 600 ml of 1-hexene, and 10 ml of 5-ethylidene-2-norbornene, and the inside temperature was raised to 80° C. while stirring the mixture. Ethylene was introduced into the autoclave such that the total pressure was 0.4 MPa. 10 ml of toluene, 5 μmols of diphenylmeth-ylene(cyclopentadienyl) (fluorenyl) hafnium dichloride synthesized by the conventional method, 2.5 mmols of triisobutyl aluminum, and 6 μmols of dimethylanilinium penta-fluorophenylborate were placed in a separate reaction vessel, and the resulting mixed solution was stirred for 20 minutes. The mixed solution was introduced into the autoclave, and polymerization was initiated. The polymerization was conducted at 80° C. for 10 minutes while maintaining the total pressure in the autoclave at 0.4 MPa by continuously introducing ethylene.

After completion of the polymerization, the reaction product was washed with a large amount of ethanol and dried under a reduced pressure at 80° C. for 12 hours to obtain 52 g of ethylene/1-hexene/5-ethylidene-2-norbornene copolymer elastomer.

The ethylene/1-hexene/5-ethylidene-2-norbornene copolymer elastomer obtained had an ethylene/1-hexene weight ratio of 15/85, an iodine value of 6, and a Mooney viscosity (ML$_{1+4}$ (100° C.)) at 100° C. of 27.

SYNTHESIS EXAMPLE 2

In a 5 liter autoclave were placed 1,000 ml of toluene and 1,600 ml of 1-hexene, and the inside temperature was raised to 40° C. Ethylene was introduced into the autoclave such that the total pressure was 0.4 MPa. 10 ml of toluene, 5 mols of diphenylmethylene (cyclopentadienyl) (fluorenyl) zirconium dichloride and 5 mmols of methylaluminoxane were placed in a separate reaction vessel and the resulting mixed solution was stirred for 20 minutes. The mixed solution was introduced into the autoclave, and polymerization was initiated. The polymerization was conducted at 40° C. for 60 minutes while maintaining the total pressure in the autoclave at 0.4 MPa by continuously introducing ethylene.

After completion of the polymerization, the reaction product was washed with a large amount of ethanol and dried under a reduced pressure at 80° C. for 12 hours to obtain 95 g of an ethylene/1-hexene copolymer elastomer.

The ethylene/1-hexene copolymer elastomer obtained had an ethylene/1-hexene weight ratio of 16/84 and a Mooney viscosity (ML$_{1+4}$ (100° C.)) at 100° C. of 20.

SYNTHESIS EXAMPLE 3

In a 5 liter autoclave were placed 2,200 ml of toluene, 600 ml of 1-hexene, and 20 ml of 5-ethylidene-2-norbornene, and the inside temperature was raised to 80° C. while stirring. Ethylene was introduced into the autoclave such that the total pressure was C.78 MPa. 10 ml of toluene, 5 μmols of (tertiary butylamido)dimethyl(tetramethyl-η5-cyclopentadienyl)silanetitan dichloride synthesized by the conventional method and 15 mmols of methylaluminoxane were placed in a separate reaction vessel, and the resulting mixed solution was stirred for 20 minutes. The mixed solution was introduced into the autoclave, and polymerization was initiated. The polymerization was conducted at 80° C. for 60 minutes while maintaining the total pressure in the autoclave at 0.78 MPa by continuously introducing ethylene.

After completion of the polymerization, the reaction product was washed with a large amount of methanol and dried under a reduced pressure at 80° C. for 12 hours to obtain 102 g of an ethylene/1-hexene/5-ethylidene-2-norbornene copolymer elastomer.

The ethylene/1-hexene/5-ethylidene-2-norbornene copolymer elastomer obtained had an ethylene/1-hexene weight ratio of 39/61, an iodine value was 9, and a Mooney viscosity ($ML_{1+4}$ (100° C.)) at 100° C. of 24.

EXAMPLE 1

2,500 ppm of α,α'-bis(t-butylperoxy-m-isopropyl)-benzene (Perbutyl P, trade name, manufactured by NOF Corporation) and 1,500 ppm of triaryl isocyanurate (TAIC, trade name, manufactured by Nihon Kasei K.K.) as a crosslinking aid were added to the ethylene/1-hexene/5-ethylidene-2-norbornene copolymer eliastomer obtained in Synthesis Example 1, and the resulting mixture was kneaded with an internal mixer (Laboplast Mill, trade name, manufactured by Toyo Seiki Seisakusho K.K.) for 30 minute(s at 180° C., thereby conducting heat-crosslinking of the elastomer.

The crosslinked ethylene/1-hexene/5-ethylidene-2-norbornene copolymer elastomer obtained was completely crosslinked, and the melt flow rate (hereinafter referred to as "MFR") could not be measured.

The crosslinked ethylene/1-hexene/5-ethylidene-2-norbornene copolymer elastomer obtained and a propylene homopolymer (Chisso Polypro HT1050, trade name, manufactured by CHISSO CORPORATION, MFR: 0.45/10 minutes) were melt kneaded at a weight ratio of 1:9 in a two roll mill kept at 180° C. During kneading, 3,000 ppm of a hindered phenol-based stabilizer (Irganox 1010, trade name, manufactured by Ciba-Geigy Corporation), 3,000 ppm of phosphorus-based stabilizer (Irgaphos 168, trade name, manufactured by Ciba-Geigy Corporation) both as heat stabilizers, and 5,000 ppm of calcium stearate as a lubricant were added thereto to obtain a polypropylene resin composition.

The polypropylene resin composition obtained was measured for the ratio of the maximum values of the shear viscosity arid the elongational viscosity, the melt drawing property, the melt tension, and the flow apparent activation energy, and the moldability was evaluated. The results obtained are shown in the Table below.

EXAMPLE 2

A crosslinked ethylene/1-hexene/5-ethylidene-2-norbornene copolymer elastomer was obtained in the same manner as in Example 1 except that triacryl isocyanurate was not used, The MFR of the ethylene/1-hexene/5-ethylidene-2-norbornene copolymer elastomer after crosslinking was 1/80 of the elastomer before closslinking.

Usingthecrosslinkedethylene/1-hexene/5-ethylidene-2-norbornene copolymer elastomer obtained, a desired resin composition was obtained in the same manner as in Example 1, and the moldability thereof was evaluated. The results obtained are shown in the Table below.

EXAMPLE 3

A desired resin composition was obtained in the same manner as in Example 1 except that a blend of a propylene homopolymer (Chisso Polypro K1014, trade name, manufactured by CHISSO CORPORATION, MFR: 4 g/10 minutes) and a long chain branch-introduced polypropylene (PF-814, trade name, manufactured by Montel Co., MFR: 3 g/10 minutes) at a weight ratio of 8:2 was used in place of the propylene homopolymer, and the moldability thereof was evaluated. The results obtained are shown in the Table below.

EXAMPLE 4

A desired resin composition was obtained in the same manner as in Example 3 except that a high pressure method low density polyethylene (Petrocene 360, trade name, made by TOSOH CORPORATION, MFR 1.6 g/10 minutes, 190° C., 2.16 kg load) was used in place of the long chain branch-introduced polypropylene, and the moldability thereof was evaluated. The results obtained are shown in the Table below.

COMPARATIVE EXAMPLE 1

The propylene homopolymer used in Example 1 was evaluated for the moldability. The results obtained are shown in the Table below.

COMPARATIVE EXAMPLE 2

The blend of the polypropylene resins used in Example 3 was evaluated for the moldability. The results obtained are shown in the Table below.

COMPARATIVE EXAMPLE 3

A composition was obtained in the same manner as in Example 1 except that a branched type low density polyethylene (Petrocene 286, trade name, manufactured by TOSOH CORPORATION, MFR: 1.5 g/10 minutes, 190° C., 2.16 kg load) was used in place of the crosslinked ethylene/1-hexene/5-ethylidene-2-norbornene copolymer elastomer, and the moldability thereof was evaluated. The results obtained are shown in the Table below.

COMPARATIVE EXAMPLE 4

A crosslinked ethylene/1-hexene copolymer elastomer was obtained in the same manner as in Example 2 except that the ethylene/2-hexene copolymer elastomer obtained in Synthesis Example 2 was used and 5,000 ppm of dicumyl peroxide was used as a crosslinking agent. The MFR of the ethylene/1-hexene copolymer elastomer after crosslinking was 1/2.95 of the elastomer before crosslinking.

A resin composition was obtained in the same manner as in Example 1 using the crosslinked ethylene/1-hexene copolymer elastomer obtained above in place of the crosslinked ethylene/1-hexene/5-ethylidene-2-norbornene copolymer elastomer, and the moldability thereof was evaluated. The results obtained are shown in the Table below.

COMPARATIVE EXAMPLE 5

A crosslinked ethylene/1-hexene/5-ethylidene-2-norbornene copolymer elastomer was obtained in the same manner as in Example 1 except that the ethylene/1-hexene/5-ethylidene-2-norbornene copolymer elastomer obtained in Synthesis Example 3 was used. The crosslinked ethylene/1-hexene/5-ethylidene-2-norbornene copolymer elastomer obtained was completely crosslinked, and MFR could not be measured.

A resin composition was obtained in the same manner as in Example 1 using the crosslinked ethylene/1-hexene/5- ethylidene-2-norbornene copolymer elastomer obtained above, and the moldability thereof was evaluated. The results obtained are shown in the Table below.

COMPARATIVE EXAMPLE 6

Moldability of a long chain branch-introduced polypropylene (PF-814, trade name, manufactured by Montel Co., MFR: 3 g/10 minutes) was evaluated. The results obtained are shown in the Table below.

TABLE

|      | Ratio of maximum values of shear viscosity and elongational viscosity | Minimum value of the ratio of strand diameter and die diameter | Melt tension (g) | Activation energy (kJ/mol) | Processability of blow molding |
|------|------|------|------|------|------|
| E 1  | 30   | 0.13 | 17.4 | 40.8 | Good |
| E 2  | 12   | 0.10 | 16.5 | 40.5 | Good |
| E 3  | 42   | 0.18 | 18.8 | 41.3 | Good |
| E 4  | 31   | <0.1 | 13.2 | 41.3 | Good |
| CE 1 | 3    | 0.11 | 14.8 | 39.9 | Poor |
| CE 2 | 4    | <0.1 | 15.3 | 42.9 | Poor |
| CE 3 | 3    | 0.12 | 14.8 | 40.3 | Poor |
| CE 4 | 4    | 0.15 | 15.0 | 41.0 | Poor |
| CE 5 | 4    | 0.15 | 16.2 | 41.4 | Poor |
| CE 6 | 39   | 0.44 | 53.0 | 48.3 | Poor |

Notes:
E: Example
CE: Comparative Example
Poor: Non-uniformity in the wall-thickness existed.

It can be seen from the results shown in the Table above that according to the present invention, a polypropylene resin composition having excellent processability is obtained.

While the invention has been described in detail and with reference to specific embodiments thereof, it will be apparent to one skilled in the art that various changes and modifications can be made therein without departing from the spirit and scope thereof.

What is claimed is:

1. A polypropylene resin composition satisfying the following conditions (a) and (b) which consists essentially of a crosslinked product of (i) an ethylene/α-olefin/non-conjugated diene copolymer elastoiner satisfying the following conditions (c) to (e) and (ii) a polypropylene resin:

(a) the resin composition can be drawn such that a diameter d of a strand obtained when the resin composition is extruded from a circular die having an inside diameter D is
d≦0.25×D, and (b) the ratio of the maximum value of elongational viscosity to the maximum value of shear viscosity, measured at the same temperature and the same rate of strain is:
elongational viscosity/shear viscosity≧5;

(c) the α-olfin has a carbon number of from 4 to 20;

(d) the ratio of the units originated from ethylene and α-olefin, ethylene/α-olefin, is 35/65 to 5/95 by weigh ratio; and (e) the iodine value thereof is larger than 0 and at most 50, wherein a blending ratio of the polypropylene resin (ii) to the ethylene/α-olefin/non-conjugated diene copolymer elastomer (i) is 99/1 to 70/30, weight ratio.

2. The polypropylene resin composition as claimed in claim 1, wherein the ratio of a melt flow rate (MFR 1) of the crosslinked product of ethylene/α-olefin/non-conjugated diene copolymer elastomer and a melt flow rate (MFR 2) of the elastomer before crosslinking is MFR 2/MFR 1> 1, or MFR 1 cannot be measured.

3. The polypropylene resin composition as claimed in claim 2, wherein the flow apparent activation energy is 35 to 45 kJ/mol.

4. A resin composition satisfying the following conditions (a) and (b) which consists essentially of a crosslinked product of (i) an ethylene/α-olefin/non-conjugated diene copolymer elastomer satisfying the following conditions (c) to (e) and (ii) a second resin:

(a) the resin composition can be drawn such that a diameter d of a strand obtained when the resin composition is extruded from a circular die having an inside diameter D is
d≦0.25×D, and (b) the ratio of the maximum value of elongational viscosity to the maximum value of shear viscosity, measured at the same temperature and the same rate of strain is:
elongational viscosity/shear viscosity≧5;

(c) the α-olefin has a carbon number of from 4 to 20;

(d) the ratio of the units originated from ethylene and α-olefin, ethylene/α-olefin is 35/65 to 5/95 by weight ratio; and (e) the iodine value thereof is larger than 0 and at most 50, wherein a blending ratio of the second resin (ii) to the ethylene/α-olefin/non-conjugated diene copolymer eleastomer (I) is 99/1 to 70/30 weight ratio, wherein the (ii) second resin is selected from the group consisting of a propylene homopolymer, a propylene-ethylene random copolymer having an ethylene content of 0.5 to 12% by weight, a propylene/ethylene/α-olefin terpolymer having an ethylene content of 0.5 to 12% by weight and a content of α-olefin of 0.5 to 20% by weight, a high impact polypropylene having an ethylene content of 1 to 60% by weight, a polypropylene having introduced therein long chain branches, a syndiotactic polypropylene, a blend of polypropylene with up to 20 wt % polyethylene, and a mixture of two or more thereof.

* * * * *